United States Patent
Taleyarkhan et al.

(10) Patent No.: US 10,843,372 B1
(45) Date of Patent: Nov. 24, 2020

(54) METHODS AND COMPOSITIONS FOR PREPARING PARTICLE BOARDS

(71) Applicant: PURDUE RESEARCH FOUNDATION, West Lafayette, IN (US)

(72) Inventors: Rusi P. Taleyarkhan, Lafayette, IN (US); Brian C Archambault, Middleton, IN (US); Alexander Charles Bakken, Landenberg, PA (US)

(73) Assignee: Purdue Research Foundation, West Lafayette, IN (US)

( * ) Notice: Subject to any disclaimer, the term of this patent is extended or adjusted under 35 U.S.C. 154(b) by 755 days.

(21) Appl. No.: 15/189,390

(22) Filed: Jun. 22, 2016

Related U.S. Application Data

(60) Provisional application No. 62/183,003, filed on Jun. 22, 2015.

(51) Int. Cl.
| | |
|---|---|
| *B32B 5/16* | (2006.01) |
| *B27N 3/00* | (2006.01) |
| *C08G 63/06* | (2006.01) |
| *C08G 63/91* | (2006.01) |
| *C08G 63/88* | (2006.01) |
| *C08J 3/12* | (2006.01) |
| *B27N 3/02* | (2006.01) |
| *B27N 3/20* | (2006.01) |

(52) U.S. Cl.
CPC .............. *B27N 3/002* (2013.01); *B27N 3/02* (2013.01); *C08G 63/06* (2013.01); *C08G 63/88* (2013.01); *C08G 63/912* (2013.01); *C08J 3/12* (2013.01); *B27N 3/20* (2013.01); *C08J 2367/04* (2013.01)

(58) Field of Classification Search
CPC ........................ C08L 67/04; Y10T 428/2982
See application file for complete search history.

(56) References Cited

U.S. PATENT DOCUMENTS

| | | | | |
|---|---|---|---|---|
| 4,797,468 | A * | 1/1989 | De Vries | C08G 63/08 528/354 |
| 7,566,753 | B2 | 7/2009 | Randall et al. | |
| 2013/0217815 | A1* | 8/2013 | Deaner | C08K 7/02 524/195 |
| 2013/0309497 | A1* | 11/2013 | Takezaki | C08J 3/14 428/402 |

FOREIGN PATENT DOCUMENTS

JP  6419376 B1  11/2018

OTHER PUBLICATIONS

Henton et al., Polylactic Acid Technology, Chapter 16, Feb. 11, 2005 (Year: 2005).*
Zhang et al., Study of the molecular weight dependence of glass transition temperature for amorphous poly(L-lactide) by molecular dynamics simulation, Polymer 48 (2007) 4900-4905 (Year: 2007).*
Ajioka et al., Basic Properties of Polylactic Acid Produced by the Direct Condensation Polymerization of Lactic Acid, Bull. Chem. Soc. Jpn., 68, 2125-2131(1995) (Year: 1995).*
Phattanaphibul et al., Preparing Biodegradable PLA for Powder-Based Rapid Prototyping, The 8th Asia Pacific Industrial Engineering and Management Systems Conferenece (APIEMS 2007) (Year: 2007).*
Kunioka et al., Biodegradation of poly(lactic acid) powders proposed as the reference test materials for the international standard of biodegradation evaluation methods, Polymer Degradation and Stability 91 (2006) 1919-928 (Year: 2006).*
American Polymer Standards Corporation, Jan. 2014 (Year: 2014).*
Garlotta, A Literature Review of Poly(Lactic Acid), Journal of Polymers and the Environment, vol. 9, No. 2, Apr. 2001 (2002) (Year: 2001).*
Kaur P., Determination of Mark-Houwink Parameters for Polylactide. JETIR Jun. 2018, vol. 5, Issue 6.

* cited by examiner

*Primary Examiner* — Hoa (Holly) Le
(74) *Attorney, Agent, or Firm* — Purdue Research Foundation; Zhigang Rao

(57) ABSTRACT

An amorphous polylactic acid polymer having a weight average molecular weight in the range of about 35,000 to 180,000 is described. The polylactic acid polymer composition can be hammer milled without cryogenics result in the form of particles wherein 90% of the particles have particle size of about 250 μm or less and the material has a glass transition temperature of between about 55° C. to about 58° C. and a relative viscosity of about 1.45 to about 1.95 centipoise.

5 Claims, No Drawings

METHODS AND COMPOSITIONS FOR PREPARING PARTICLE BOARDS

BACKGROUND

Natural adhesives such as animal glues, fish glues, vegetable glues and casein (the main protein in milk) are generally set upon solvent preparation and offer low strength and are susceptible to moisture and mold. Their use is mainly for joining low strength materials.

Elastomer adhesives such as natural rubbers, neoprene, acrylonitride budadiene, butyl/rubber adhesives, styrene butadiene rubber adhesives, polyurethane adhesives, polysulfide rubber adhesives, and silicone rubber adhesives are based on natural and synthetic rubbers set by solvent evaporation or heat curing; they have relatively low strength and suffer from creep and therefore are not usually used for stressed joints. More typically, they are used for flexible bonding of plastics and rubbers.

Thermoplastic adhesives such as polyvinyl acetate (PVA), polyvinyl alcohol (PVA), polyacrylates, polyester acrylics, acrylic solvent cement, cyanoacrylates (superglue), silicone resins, polyamides and acrylic acid diesters have low/medium strength and may suffer from creep and attack from water but not from oils.

Thermoset adhesives such as urea formaldehyde (UF), phenol formaldehyde (PF) resins, phenolic neoprene, polyesters, polyamides and epoxy resins set as a result of the buildup of rigid molecular chains with cross-linking under various conditions of temperature and moisture.

Toughened rubber modified adhesives include small rubber-like particles dispersed throughout a glassy matrix are resistant to crack propagation and have been applied to acrylic and epoxy-based adhesives.

The general performance characteristics of these adhesives in terms of shear strength and range of operating temperatures are summarized in the table below.

TABLE 1

Properties of conventional adhesives

| Adhesive Type | Shear strength (MPa) | | Operating temperature (C.) | |
|---|---|---|---|---|
| | Min. | Max. | Min. | Max. |
| Rubber | 0.35 | 3.5 | −20 | 150 |
| PVA (white glue) | 1.4 | 6.9 | | |
| Cyanoacrylate | 6.9 | 13.8 | | 80 |
| Anaerpbo | 6.9 | 13.8 | | 200 |
| Polyurethane | 6.9 | 17.2 | −200 | 150 |
| Rubber modified epoxy | 13.8 | 24.1 | −40 | 90 |
| Epoxy | 10.3 | 27.8 | | 200 |
| Polyamide | 13.8 | 27.6 | | 350 |
| Rubber modified epoxy | 20.7 | 41.4 | | 180 |

Note:
1 MPa = 10 bar about 147 psi; 1,000 psi = about 6.9 MPa

The strength of adhesives is dependent on how well the adhesive has bonded to the surface of a material (i.e., substrate), as well as on the cohesive strength of the adhesive itself. Virtually all of the listed compositions emit volatile organic compounds (VOCs) and they require set times ranging from tens of minutes to days, and the operating temperatures are generally below 150° C. to 200° C.

One area where novel adhesives are needed is in the area of particle board manufacture. Examples of boards in use today include laminate flooring. Laminate flooring can be prepared by coating an adhesive onto wood particles or floors at high temperature, followed by molding and hot-pressing. Since the laminate flooring can be subjected to complicated machining and the like, the laminate flooring is widely used for interior finishing or overall furniture products. New adhesives are needed that can be used in the manufacture of particle boards.

Currently the adhesive used to make particle boards is mainly urea-formaldehyde resin or a melamine-urea-formaldehyde resin. These adhesives exhibit good adhesion and are low-priced but the adhesive can irritate the eyes, nose and skin, as well as causing atopic diseases and bronchial asthma even after curing, and gradually emits formaldehyde, which can cause cancer when inhaled for a long time. In addition, excess melamine intake can result in formation of kidney stones in humans. Further, melamine, urea, formaldehyde and the like, which are prepared from fossil resources can be subject to price appreciation as fossil resources become depleted. Moreover, their production is associated with the emission large amounts of greenhouse gases and they consume a large amount of energy to prepare. During particle board manufacturing the use of urea formaldehyde adhesives requires use of scavengers and VOC relief equipment which can lead to industrial safety, handling and cost issues. Lastly, they are known to emit a variety of toxic substances such as endocrine disruptors, toxic gases and the like, when incinerated.

New adhesives are needed that have improved fatigue behavior and reduced stress concentration zones. They should be easy to use, allowing for high through put and have sealing capability such that the adhesive joint can seal joined materials from moisture and air. In addition, they should not melt or otherwise modify the substrates they are intended to join, they should be amenable to use in joining a broad range of substrates including aluminum substrates and they should be of minimal density.

SUMMARY OF INVENTION

An amorphous polylactic acid polymer having a weight average molecular weight (Mw) in the range of about 35,000 to 180,000 is described. The polylactic acid polymer in treated form using either of thermal, hydrolysis or ionizing beam methods a resulting composition of MW in the 35,000 to 45,000 range which can be reduced to particles by single pass commercial grade (e.g., Fitzpatrick) hammer milling with dynamic screening and without cryogenics wherein 90% of the particles have particle size of about 250 μm or less and the material has a glass transition temperature of between about 55° C. to about 58° C. and a relative viscosity at 30° C. is about 1.45 to about 1.95 and more preferably 1.45 to about 1.6. The polymer composition can be used to form an aqueous suspension or used directly in dry form. The material is ideally suited for use in preparing particle-board.

A method is disclosed for preparing such polylactic acid polymers. The method involves obtaining an amorphous polylactic acid polymer having a weight average molecular weight of between about 115,000 to about 180,000 and more preferably about 140,000 and possessing relative viscosity (based on dilution viscometry) of about 2.5. Treating the polylactic acid polymer to reduce the molecular weight to between about 35,000 to 45,000 and more preferably about 43,000 such that it has a glass transition temperature of between about 55° C. and 58° C. and a relative viscosity based on dilution viscometry of about 1.45 to about 1.60. Material can be formed into particles such that 90% of the particles have an average diameter of less than 250 μm. This can be carried out using industrial type hammer milling equipment and can be accomplished in a single pass with dynamic screening. Importantly, this can be accomplished without resorting to cryogenic cooling.

The molecular weight and relative viscosity of the starting amorphous type polylactic acid polymer can be reduced from about 140,000 to 180,000 with a glass transition temperature of about 67° C. and a relative viscosity of about 2.5 down to a molecular weight of about 44,000 and a relative viscosity of about 1.5 by hydrolysis in a constant temperature water bath at about 92° C. for about 8.5 hours. Alternatively, the starting high molecular weight polymer can be processed thermally at a temperature of 255° C. for a sufficient time of about 45 minutes to obtain the desired molecular weight and viscosity in glass transition temperature. The molecular weight can also be reduced by treating material with radiation such as with $Co^{60}$ for a dose of about 100 kGy or with an eBeam a dose of about 200 kGy or alternately, in equivalent fashion using UV radiation.

Suitable polymers can also be produced directly via ring polymerization by continually building up the size of the polymer chain starting with D and L-form lactides starting from corn-derived dextrose. A similar but controlled pathway can be taken to adjust the process parameters to arrest further polymerization once the desired combination of molecular weight of about 43,000 and relative viscosity of about 1.5) and having a glass transition temperatures in the 55-58° C. range. This can be accomplished from dynamic monitoring of molecular weight and relative viscosity of the polymer during the polymerization

DETAILED DESCRIPTION OF INVENTION

The term "about" means within 10%.

The term "molecular weight" refers to a weight average molecular weight for purposes of this specification.

The term "relative viscosity" of a polylactic acid polymer presented in this disclosure specifically refers to the ratio of the viscosity of a polylactic acid polymer solution in a solvent chloroform, to the viscosity of the solvent chloroform itself. The "relative viscosity" is measured per guidance from ASTM D445, D2957 and D5225 standards. The relative viscosity is measured in $CHCl_3$ at 30° C.

A polylactic acid polymer composition is disclosed. The polylactic acid polymer is amorphous and has a weight average molecular weight in the range of about 35,000 to 45,000 for enabling sufficient strength but also enablement for single-pass (about 90% of the feed mass) powder production in a commercial grade hammer mill—example Fitzpatrick Hammermill. Alternately, for ~50% higher end strength of the particle board the weight average molecular weight may be higher towards about 120,000 with a glass transition temperature of about 65-70° C., but for which hammer mill based pulverizing without cryogenics may require multiple 2-3 passes—a feature that may be overcome by conducting the milling under cryogenic (liquid nitrogen temperature type) conditions. In an embodiment the treated material has a particle size sufficient to pass through a sieve having a pore size of about 250 µm or less which can be formed without resort to cryogenics during hammer milling in a single pass. In an embodiment the treated polymer composition has a glass transition temperature of between about 55° C. to about 58° C. In an embodiment the treated material has a relative viscosity of the material at 30° C. (The relative viscosity for polylactic acid polymer is measured based on dilution viscometry with chloroform as the solvent for polylactic acid polymer.) of about 1.45 to about 1.95 and more preferably about 1.45 to about 1.6.

The polylactic acid polymer can contain about 10 to about 15 mole percent D-lactide and can be prepared from an amorphous polylactic acid polymer having a higher molecular weight or can be synthesized by polymerizing lactic acid using well known means. For example, a commercial polylactic acid known as 10361D® can be purchased commercially from Natureworks. That polymer can then be made into a polymer powder form with 90% of the initial mass run down below about 250 microns in a single pass using a commercial grade (e.g., Fitzpatrick) hammer mill with continual bypass and without resort to cryogenic type cooling-having suitable characteristics for particle board manufacture by any suitable means. Several alternate crushing means are also contemplated, e.g., by placing the multi-mm polymer resin in a blender, or subjecting to impact loads or expulsion from high pressure nozzles as used for atomization. Amorphous polylactic acid polymers having a molecular weight in the range of about 115,000 to about 180,000 can also be used to provide roughly 30-50% higher internal bond strengths of the plywood but they are not as easily pulverized. The process of milling or pulverizing leads generally in nature to size distribution (often in the log normal variety) which can be characterized by a 90% upper bound size (e.g., 90% of the initial mass ground down such that the highest size is about 250 microns). The impact of varying the polymer powder (upper bound) size on resulting particle board strength is also specified elsewhere in this application.

In one method the 10361D® polymer starting material can be suspended in water and heated at a constant temperature of about 92° C. for about 8.5 hours. Lower temperatures can be used for longer periods of time as desired. Temperatures significantly higher than about 94° C. result in pellet clumping. The material can then be dried by any suitable conventional means such as by heating in an oven at about 50° C. for 20-24 hours to reduce the moisture content and then substantially (90%+ feed) ground in a single pass using to the desired particle size of under 250 microns, such as by a commercial grade Fitzpatrick hammer mill. The preparation of a material that can be sieved thru a 250 micron or smaller sieve provides for the preparation of stable aqueous suspensions that can be used interchangeably with current melamine or formaldehyde based adhesives used in current particle board manufacturing operations without clogging aqueous adhesive emulsion spray nozzles or mixed directly in dry form with furnish. The resulting particle board has water resistance characteristics and a suitable strength for widespread use in the particle board manufacturing industry.

Natureworks 10361D® polylactic acid can also be processed by heating and melting the ~2-3 mm resin beads at a constant temperature of about 255° C. for about 45 minutes taking care to minimize oxidation at the melt-air interface (or alternately, to do the melting in an inerted environment). This heating process causes the polymer to melt and clump but causes a reduction in molecular weight and relative viscosity. Therefore, once the heating is discontinued processing the chunky material to pass through a mesh sieve (of the desired range—e.g., 250 micron) is more difficult. This can be alleviated by making pellets during melting by extrusion processes or by cooling in a dimpled pan or crushing. Once the material is processed to a suitable form and size it can be introduced into a commercial grade hammer mill and ground into a suitably sized powder in a single stage. Generally, a powder of having an average crosssection of no more than about 250 microns is desired; smaller particle sizes such 200, 150, or even 100 microns or less are also contemplated in order to more evenly spread and stick to the wood particulates in the furnish resulting in higher strength.

Natureworks 10361D® polylactic acid can also be processed using an irradiation process such as by treating the polymer with about 100 kGy of $Co^{60}$ gamma irradiation or about 200 kGy with an electron beam and then processed to form particles by (Fitzpatrick grade) hammer milling in a single stage without cryogenics that can then substantially (~90%) pass through a 250 micron sieve or smaller.

The ground polylactic acid can then be used to prepare an aqueous suspension. Any concentration of polylactic acid can be used that can provide enough adhesive in the suspension for convenient use in particle board manufacture but which does not allow for particle agglomeration during storage. For example, about 10 wt. % to about 75 wt. % can be used, more preferably about 20 wt. % to about 55 wt. %, even more preferably about 25 wt. % to about 40 wt. % and generally a weight percent of about 33 to about 35 is envisioned. For suspensions having more than 55 wt. % solid content particle sizes below about 125 microns are used to avoid adhesive particle coagulation can be achieved by using a suitable surfactant.

A surfactant such as Triton X-100 can be added to the water to help prevent particle agglomeration. For example, from about 0.3 wt. % to 10 wt. % of a surfactant can be added to the water followed by addition of the prepared polylactic acid polymer particles. The mixture can be mixed to form the suspension. A suspension made in this manner will remain a suspension for from several days to weeks without significant settling or coagulation. In the event that settling does occur the suspension can be easily reformed by mixing.

The suspension made as described herein can be used in place of conventional formaldehyde and melamine adhesive preparations for the production of particle board without the need for significant changes to the equipment used for particle board manufacturing.

Particleboard or chipboard can be manufactured by mixing wood particles or flakes together with a resin and forming the mixture into a sheet. The raw material to be used for the particles can be prepared by any suitable means, such as by feeding it into a disc chipper with radially arranged blades. The particles are then dried, after which any oversized or undersized particles can be screened out resulting in what is referred to as furnish.

An adhesive resin such as the suspension of or in dry powder form of the polylactic acid polymer described herein is then mixed into or sprayed through nozzles onto the particles. Mixing is performed using variety of conventional mixing methods including: shaking in a bag, tumbling in rotary mixer, or placement in a vessel and using rotary paddles. Due to color variations of resin powder to that of furnish any localized clumping of resin powder or segregation can be noticed by the naked eye as well as via examining random samples of mixtures for uniformity via relative ratios of furnish to powder masses.

Various other chemicals can also be added to the particle boards during manufacture including wax, dyes, wetting agents, release agents. These additives can be used to make the final product water resistant, fireproof, insect proof, or to give it another desirable quality.

Once the resin has been mixed with the particles, the mixture is made into a porous sheet. A weighing device notes the weight of flakes, and they are distributed into position by rotating rakes. In graded-density particleboard, the flakes are spread by an air jet that throws finer particles further than coarse ones. Two such jets, reversed, allow the particles to build up from fine to coarse and back to fine.

The sheets formed are then compressed to mats to reduce their thickness and make them easier to transport. Later, they are compressed again, under heat (at platen temperatures ranging from about 150° C. towards 220° C.) pressures between 2 and 4.2 megapascals (290 and 600 psi). Platen temperatures above 220 C are not recommended due to significant burning of the wood (the avoidance of which may be accomplished by using an inerted environment, e.g., use of argon or nitrogen enriched ambient). A non-stick Teflon type sheet is preferably placed between the metal plate and the mat during board formation to minimize sticking related wear and unevenness upon pulling up the platen. All aspects of this entire process must be carefully controlled to ensure the correct size, density and consistency of the board. Higher temperatures and pressures reduce the time required for particle board formation and are desirable for enhanced throughput if explosive blowouts can be prevented. Conventional thermoset adhesives such as urea formaldehyde set and harden while being processed and can give rise to blowouts and hence require lower temperatures and pressures during board formation. The thermoplastic nature of the reduced molecular weight and relative viscosity amorphous polymer of this invention permits faster throughput blowout free particle board formation. The optimally reduced viscosity at temperatures from 140° C. to as high as 220° C. permit steam relief without blowout once the overpressure is removed. When using the adhesive (of MW in range of about 35,000-140,000) as described in this invention, attaining the temperature of about 140-145 C or higher throughout the matrix is preferred in order to activate that adhesive prior to pressure relief and cooldown to form particle boards. While the outer edges of the particle board next to the hot platen take less time to reach to about 140-145 C, the central core region can take longer for which a pre-calibration must be done for the furnish type, desired end density, amount of resin and also, the initial moisture content. Moisture content can be expected to play a significant role because boiling off water occurs at its saturation temperature, is endothermic, only after which the matrix temperature can substantially rise towards the desired 140-145 C range or above. For example, the time required under the platen varies with thickness and density of the board. For nominal density in the ~0.75 g/cc range and thickness of ¼" under typical ~10% moisture content; ~10 w/o of adhesive and platen temperatures and pressure settings in an industrial grade Wabash mfg. style press of about 220 C and 600 psi respectively, the time it would take the centerline temperature to reach ~140-145 C can be expected to be about 2 minutes or less; thicker boards and higher moisture content and density can require longer times. The resulting particle boards provide adequate performance similar to or superior to those of commercial grade particle boards made with urea formaldehyde and other conventional VOC bearing resins: viz., per ASTM D1037; ANSI A208.1-2009 using an Instron 556A load frame tester—modulus of rupture (Rb) s of about 7 MPa (1 ksi), modulus of elasticity in the 700 MPa (100 ksi) range and internal bond (IB) strength above 0.14 MPa (20 psi) towards and above 0.7 MPa (100 psi). The IB value can be made to vary depending on adhesive loading and particulate size. For example, for a nominal loading of about 8.5 w/o of adhesive, ~12% moisture content and use of milled adhesive particles of size below 250 microns one may attain IB ~0.7 MPa (100 psi) range. If coarser particles are used the degree of adhesive spread with the furnish to cause adhesion can result in lower strength and IB values. For example, for ¼" to ⅝" type range thick boards starting with about 10 w/o to 15 w/o resin for a resultant ~0.75 g/cc board: if milled particles below 500 microns (i.e., 2×250) are used, the IB can be expected to reduce by a factor of ~2 down to ~0.35 MPa (~50 psi); with 1000 micron diameter and below, a further reduction of ~2 may be expected to ~0.175 MPa (~25 psi) and so on but going significantly above, e.g., to <2,000 micron powders now can suddenly result in virtually sharp reductions in IB towards ~<0.01 MPa (<1 psia type values). Such reduction in IB may be compensated by increasing the initial adhesive resin loading—which can produce nonlinear increases in IB values. For example, for a nominal case (e.g., 12% moisture; 0.75 g/cc final density) if the adhesive content is increased towards 20-30%, the IB value may more than double towards 200-300 psia range. Producing boards under this method can result in thicker boards with lower internal bond strengths than thinner boards, an aspect which can be controlled by changing the aspect ratio during hot compression.

Methods for repairing and reusing particle boards made from the disclosed polylactic acid polymers are also contemplated. For example, a cracked particle board can be repaired by directly subjecting the damaged particle board to compression and heating for example at 4.2 MPa (600 psi) and 220° C. platen temperature as discussed earlier, for time commensurate with bringing the internal board to temperatures at or above about 140-145° C. to reactivate full adhesion strength upon cooldown. The resulting board then possesses similar strength and functionality of the original board.

Another means for particle board formation with the polymer adhesive described herein is to prepare the mats as described earlier and instead of hot compressing the mat under platens as is the norm, the mat may instead be placed in a heated enclosure like in an oven or via radiant lamps or induction heating, to bring the mat contents up towards about 140-145 C or higher to activate the adhesive for highest strength, followed with stamping compression under loads and traverse commensurate with reaching the desired density and thickness. Significant wood burning or charring should be minimized by control of the ambient oxygen content (e.g., inerting by use of argon or nitrogen) or placing a suitable barrier/film. The stamp machine temperature would preferably remain at or above the glass transition temperature for the polylactic based thermoplastic adhesive described herein. During stamping a non-stick layer such as a Teflon or ptfe film may be used to avoid localized sticking and ensuring a smooth surface. Below about 100 C the amorphous adhesive tends to harden sufficiently such that once the board temperature is below this level the external compression may be relieved and the board allowed to cool down to ambient temperature.

The invention claimed is:

1. A polylactic acid polymer composition comprising an amorphous polylactic acid polymer having a weight average molecular weight in the range of about 35,000 to 45,000, wherein the material has a particle size sufficient to pass through a sieve having a pore size of about 250 um or less, wherein the material has a glass transition temperature of between about 55 C to about 58 C, and the relative viscosity of the material is about 1.45 to about 1.95, wherein the relative viscosity is measured at 30° C. based on dilution viscometry with chloroform as solvent.

2. The polylactic acid polymer of claim 1 wherein the relative viscosity is from about 1.45 to about 1.6.

3. An aqueous suspension that remains stable for over 30 days without coagulation comprising the polylactic acid polymer composition of claim 1 together with a surfactant in which the surfactant is about 0.3 wt. % to 1 wt. %, the suspension containing about 55 wt. % of poly lactic acid polymer.

4. An aqueous suspension that remains stable for over 30 days without coagulation comprising the poly lactic acid polymer composition of claim 1 together with a surfactant in which the surfactant is about 0.3 wt. % to 1 wt. %, the suspension containing about 70 wt. % of poly lactic acid polymer having a particle size sufficient to pass through a sieve having a pore size of about 125 micron.

5. A particle board comprising the polylactic acid polymer composition of claim 1.

* * * * *